Figure 1:
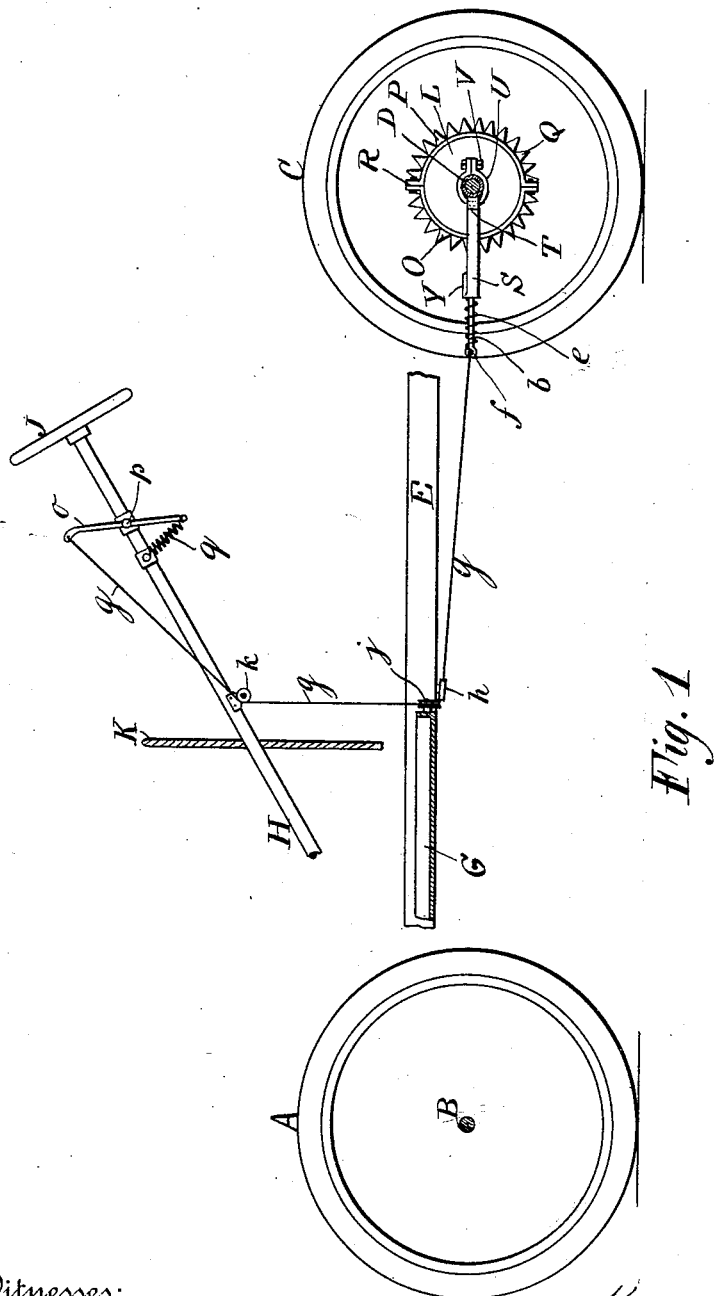

K. MYGATT.
SIGNALING DEVICE FOR VEHICLES.
APPLICATION FILED FEB. 6, 1912.

1,058,089.

Patented Apr. 8, 1913.

2 SHEETS—SHEET 1.

K. MYGATT.
SIGNALING DEVICE FOR VEHICLES.
APPLICATION FILED FEB. 6, 1912.
1,058,089.
Patented Apr. 8, 1913.
2 SHEETS—SHEET 2.
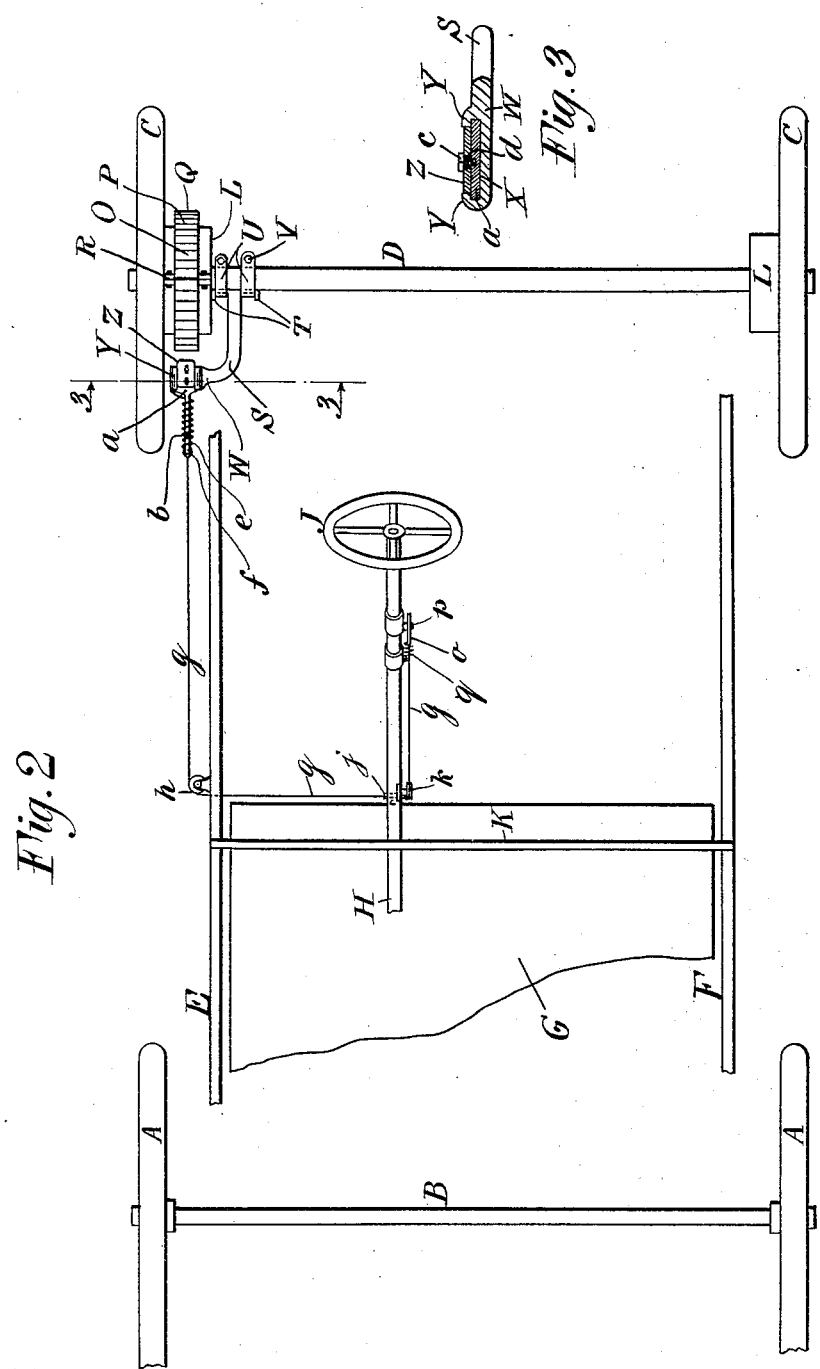

UNITED STATES PATENT OFFICE.

KENNETH MYGATT, OF PELHAM MANOR, NEW YORK.

SIGNALING DEVICE FOR VEHICLES.

1,058,089. Specification of Letters Patent. Patented Apr. 8, 1913.

Application filed February 6, 1912. Serial No. 675,846.

*To all whom it may concern:*

Be it known that I, KENNETH MYGATT, a citizen of the United States, and a resident of Pelham Manor, New York, have invented certain new and useful Improvements in Signaling Devices for Vehicles, of which the following is a specification, accompanied by drawings.

This invention relates to signaling devices for motor vehicles and the like, and the primary object of the invention is to secure a simple, cheap and effective device producing a warning signal of a character which may be heard under practically all conditions of city and suburban travel. The device is so constructed that it may be readily mounted in connection with a rotating part of any car, and the controlling device and operative connections therefrom may be mounted in any desired position on the vehicle.

To these ends the invention consists of the devices substantially as hereinafter fully described and claimed in this specification and shown in the accompanying drawings, in one of its preferred embodiments, in which—

Figure 1 is a diagrammatic side elevation partly in section and partly broken away, of a motor-vehicle having the signaling device attached thereto; Fig. 2 is a diagrammatic top plan view partly broken away, of the vehicle and apparatus shown in Fig. 1; and Fig. 3 is an enlarged detail sectional view on the line 3—3 of Fig. 2.

Referring to the drawings, sufficient parts of an automobile runabout have been illustrated diagrammatically to show means for operatively connecting the signaling device to the car.

A represents the front wheels connected by the axle B, and C represents the rear wheels connected by the axle D. The reaches E and F of the frame are shown broken away and G represents the location of the dust-pan also broken away. The steering-post H is provided with the usual steering-wheel J, and K represents the position of the dash-board relative to the steering-post.

In those cars in which internal expanding brakes are provided for the rear wheels, there is usually a coöperating housing or casing L around the brake shoes, and secured to the wheel so that this casing rotates with the wheel. In accordance with this invention a toothed member is removably secured to a rotating part of the vehicle, as for instance, the rotating casing L, and a coöperating member is stationarily supported relative to the toothed member, as by attachment to the non-rotating axle D, or to a non-rotating sleeve upon said axle, in accordance with the particular construction of the car.

I prefer to construct the toothed member in the form of a star-wheel rim in sections and as shown, O and P represent the sections of the star-wheel rim having the teeth Q extending outwardly in the plane of the toothed member. These sections are provided with lugs R adapted to be suitably bolted together around the casing or housing L.

A bracket or holder S having the base flanges T is adapted to be secured to the axle D as by means of the straps U having the securing bolts V. The bracket or holder S is provided with the bent arm W recessed at X and provided with the jaws Y for holding the spring tongue Z which is adapted to coöperate with the teeth on the star-wheel rim. A plate $a$ is preferably mounted in the recess X, and provided with the stem $b$. The tongue Z is adjustably screwed to the plate $a$ as by means of the pins $c$ passing through the slots $d$ in the tongue and screwed into the plate X. By sliding the plate X in its holder, the tongue may be brought into engagement with the star-wheel teeth or disengaged therefrom. When the tongue is in engagement with the teeth, the signal is sounded, which is in the nature of a rattle, producing a sharp and strident note which can be heard above the din of city traffic.

Suitable means are provided for operating the signal controlled from a convenient position on the car. I prefer to control the signal from a position adjacent the steering apparatus and in this instance a tension spring $e$ is secured to the arm W at one end and secured to the loop $f$ on the stem $b$ at the other end, so that said spring normally tends to force the tongue Z into engagement with the teeth Q. A cord or chain $g$ is connected to the stem $b$ and passes longitudinally of the car over the pulley $h$ suitably secured to the reach E, thence over the pulley $j$, suitably secured to the dust-pan G, thence over the pulley $k$ secured to the steering-post H and is connected to one end of a controller or hand operating device $o$ pivoted at $p$ to the steering-post. The other end of the controller or arm *o* is connected by a retracting spring *q* to the steering-post. The retracting spring *q* is preferably stronger that the tension spring *e* on the stem *b* so that the controller or arm *o* is normally retracted as shown in Fig. 1, and the tension spring *e* is normally under tension, thereby maintaining the spring tongue Z normally out of engagement with the toothed member. By pressing down on the end of the controller to which the cord or chain *g* is attached, the tension spring *e* will act to force the plate X longitudinally in its holder and carry the tongue Z into engagement with the teeth, thereby sounding the signal. I have illustrated one suitable form of controller and operative connections between the controller and the spring tongue, but obviously other suitable devices and connections may be devised for this purpose. The operative connections I have shown do not interfere with the operative parts of the car and may be conveniently manipulated by the driver. The coöperating parts of the signaling device, as the star-wheel rim, the bracket or holder, and the spring tongue, are so devised and mounted on the car that they do not interfere with the driving connections, the brake, or the parts of the frame. The effective portion of the spring tongue may be varied by loosening the pins *c* and adjusting the position of the tongue on the plate X. The parts of the signaling device may be readily removed for repairs or adjustment and it is to be understood that parts of different sizes should be supplied for cars of different sizes, depending upon the size of the axle or sleeve and the size of the brake housing L.

The device is simple and cheap to manufacture and produces an effective signal, which is not liable to get out of order and complies with the requirements and conditions found in modern automobiling.

I claim and desire to obtain by Letters Patent the following:

1. A signaling device for vehicles, comprising a member adapted to be secured to a rotating part of the vehicle and provided with peripheral teeth extending outwardly in the plane of said member, a holder adapted to be stationarily secured to another part of the vehicle adjacent the toothed member, a spring tongue radially movable on said holder relatively to the toothed member and normally out of engagement with the toothed member, and means for moving said spring tongue into engagement with the teeth on the toothed member to sound the signal by impact of the tongue against the teeth.

2. A signaling device for vehicles, comprising a star-wheel rim formed in sections and adapted to be clamped to a rotating part of the vehicle, a holder adapted to be stationarily secured to another part of the vehicle and extending into proximity to the teeth on the star-wheel rim, a spring tongue slidably mounted on said bracket or holder and normally in retracted position, and means for sliding said tongue into and out of engagement with the teeth on said star-wheel rim.

3. A signaling device for vehicles, comprising a toothed member adapted to be actuated by a rotating part of the vehicle, a spring tongue slidable into and out of engagement with the teeth on said toothed member, a tension spring for forcing said tongue into engagement with the toothed member, a controlling device mounted on the vehicle, operative connections between said controlling device and the spring tongue, and a retracting spring connected to said controlling device and opposing the said tension spring for normally holding the spring tongue out of engagement with the toothed member.

In testimony whereof I have signed this specification in the presence of two subscribing witnesses.

KENNETH MYGATT.

Witnesses:
HERBERT G. OGDEN,
M. M. REIMANN.